United States Patent [19]

Grosch et al.

[11] 4,281,702

[45] * Aug. 4, 1981

[54] PNEUMATIC TIRE

[75] Inventors: Karl A. Grosch, Roetgen; Paul H. Moitzheim; Gert Schloesser, both of Aachen, all of Fed. Rep. of Germany; Daniel J. M. Hensgens, Ubach-Overworms, Netherlands

[73] Assignee: Uniroyal Engelbert Reifen GmbH, Aachen, Fed. Rep. of Germany

[*] Notice: The portion of the term of this patent subsequent to Apr. 24, 1993, has been disclaimed.

[21] Appl. No.: 922,911

[22] Filed: Jul. 10, 1978

[30] Foreign Application Priority Data

Aug. 17, 1977 [DE] Fed. Rep. of Germany ... 7725496[U]

[51] Int. Cl.³ .................................... B60C 11/00
[52] U.S. Cl. .......................... 152/209 R; 152/353 G; D12/143

[58] Field of Search .......... 152/209 A, 209 B, 209 R, 152/209 D, 353 G, 353 C, 352 R; D12/141, 142, 143

[56] References Cited

U.S. PATENT DOCUMENTS

| | | | |
|---|---|---|---|
| D. 205,390 | 7/1966 | Wittenmyer | D12/143 |
| D.228,889 | 10/1973 | Boileau | D12/142 |
| D. 251,661 | 4/1979 | Grosch et al. | D12/143 |
| 3,897,813 | 8/1975 | Verdier | 152/209 R |

Primary Examiner—John T. Goolkasian
Assistant Examiner—Thomas Bokan
Attorney, Agent, or Firm—Charles A. Blank

[57] ABSTRACT

A pneumatic radial tire for trucks which exhibits high dimensional stability, satisfactory behavior in running in a rectilinear course, has particularly high resistance to shoulder wear and exhibits a satisfactory drainage effect.

1 Claim, 3 Drawing Figures

PNEUMATIC TIRE

This invention relates to pneumatic tires and, more particularly, to pneumatic radial tires for trucks, of the type in which there is provided a tread defined by shoulder regions and having circumferentially continuous profiled ribs separated or defined by circumferential grooves.

It is an object of the present invention to provide a new and improved pneumatic tire such that the truck tire exhibits in operation a high dimensional stability, satisfactory behavior in running in a rectilinear course and nevertheless a particularly high resistance to shoulder wear, while the tire exhibits moreover a satisfactory drainage effect.

In accordance with the invention, a pneumatic tire comprises a tread defined by shoulder edges and having circumferentially continuous profile ribs defined by circumferential grooves. The axial width of the tread between the shoulder edges comprises only five ribs including two marginal ribs and one central rib of respectively large axial width and comparatively narrower respectively intermediately situated ribs. Each intermediate rib is defined with respect to the central rib by an axially wide continuous circumferential groove and, with respect to the marginal ribs, by a comparatively narrower continuous circumferential groove.

In the case of this tire, the tread profile is defined by closed circumferential ribs. The feature that is particularly striking is the wide, full central rib and the wide profiled grooves defining the same. Owing to the wide full central rib, the tread is given high dimensional stability in operation and exhibits a particularly satisfactory behavior in running rectilinearly. The wide grooves defining the central rib provide for a rapid and reliable drainage of water.

The intermediate rib constitutes with its related marginal rib in each case a compact shoulder profile subdivided only by a circumferentially continuous narrow groove. This shoulder profile guarantees a very high resistance to shoulder wear. The tire therefore has an elevated operating capacity.

In view of the fact that, upon inflating the tire, the central area of the tread tends to expand radially under the pressure, in the case of the pneumatic tire of the present invention, the particularly wide central rib, in combination with the belts customarily used with such tires, provides a relatively high resistance to the radial expansion. The arching of the tread is, by comparison with standard truck tires, substantially flatter in the case of the pneumatic tire of the present invention.

Preferably, the marginal ribs have substantially the same axial width as the central rib. In that case, the axial widths of the marginal ribs and of the central rib can amount preferably to respectively about one-sixth of the axial tread width between the shoulder edges.

The axial width of each circumferential groove defining the central ribs constitutes in this case substantially one-half of the axial width of the central rib.

Preferably, the marginal ribs are provided beyond the shoulder regions with profile sections defined by marginal grooves spatially arranged in circumferential direction and oriented substantially radially inwardly toward the tire sidewall, with the marginal grooves terminating at the level of the free ends of said profile sections in each instance in a groove continuing in circumferential direction. Owing to the marginal grooves and the adjoining circumferential groove, the tire has the desired flexibility between the sidewalls of the tire and the tire shoulder regions.

For a better understanding of the present invention, together with other and further objects thereof, reference is made to the following description, taken in connection with the accompanying drawings, and its scope will be pointed out in the appended claims. Referring now to the drawings:

Figure 1:
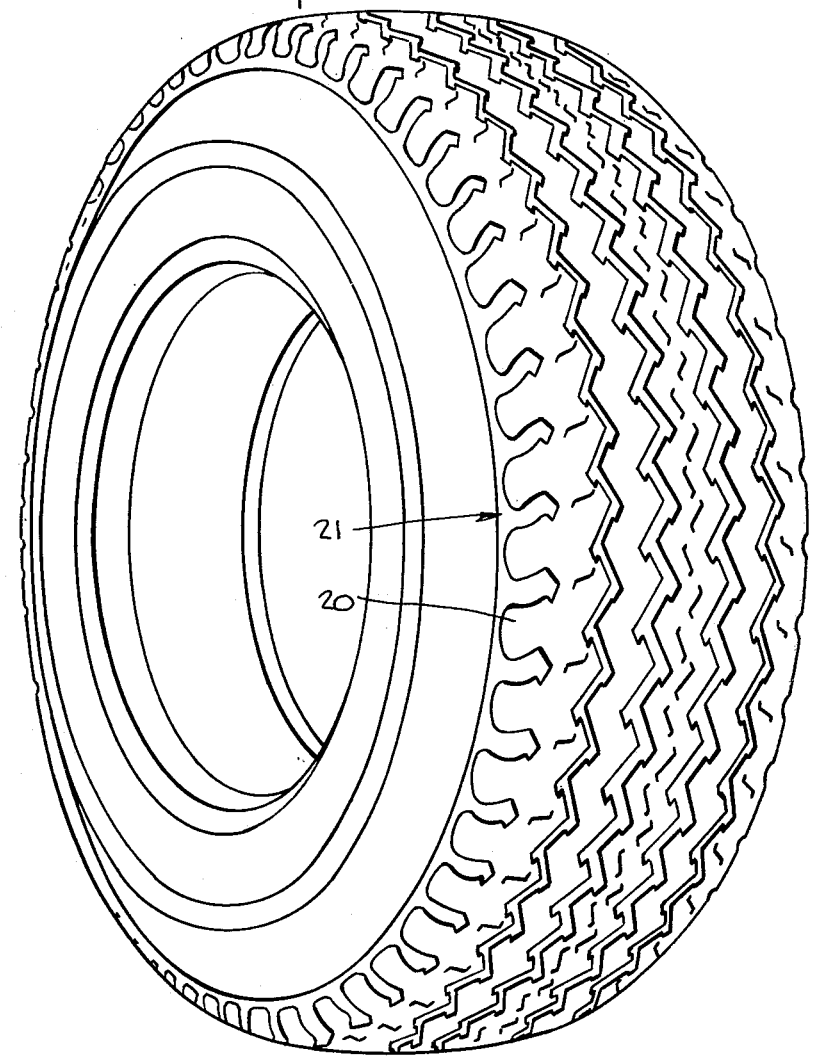
FIG. 1 is a perspective view of the pneumatic tire constructed in accordance with the invention.
Figure 2:
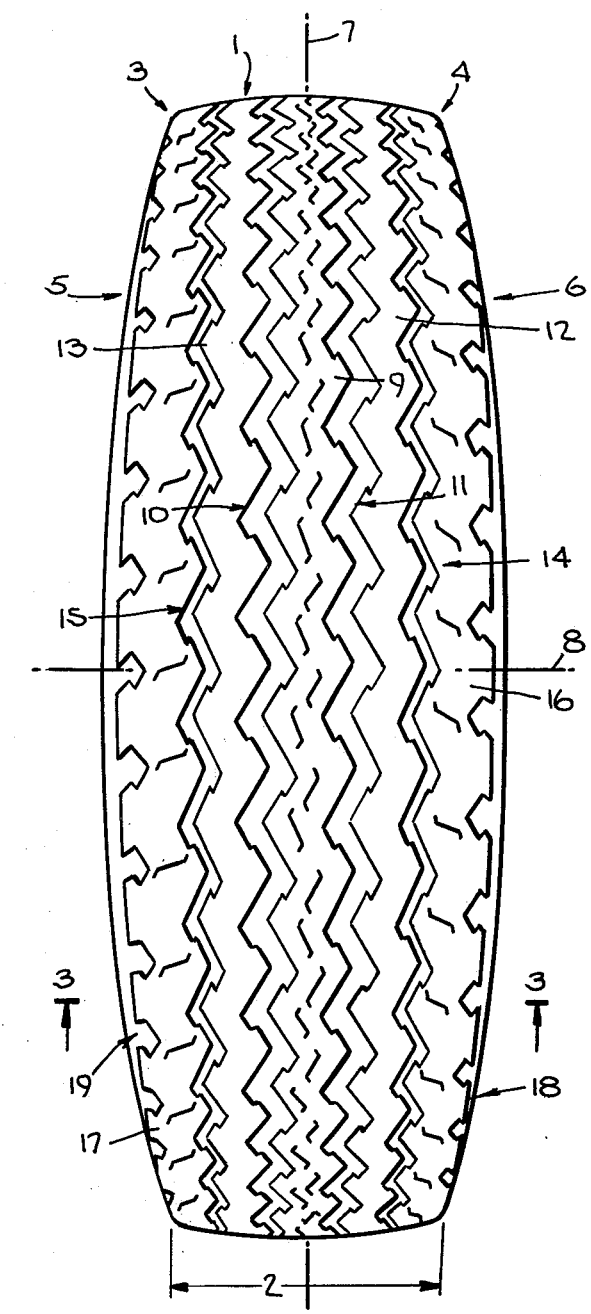
FIG. 2 is a top view of the FIG. 1 tire.

The tire is built in a conventional manner. The tire can be a truck tire having a steel cord radial carcass, steel strand beads, and a steel cord belt. Referring to FIGS. 1 and 2, along its width 2, the tread 1 is defined between its shoulder borders 3 and 4 that are situated in the shoulder regions 5 and 6. From its shoulder borders 3 and 4, the contour of the tire projects substantially radially inwardly in the direction toward the axis 8 of the tire.

The tread profile is not designed symmetrically with respect to the circumferential central line 7 of the tread, even though the profile elements repeat themselves along each tread half with the same spacing and the same configuration.

The tread profile shows a particularly wide and circumferentially continuous central rib 9 circumferentially extending in zig-zag shape and provided with projections that enlarge the lengths of the rib edges, as well as with fine slits. The wide central rib 9 is bilaterally defined by likewise unusually wide continuous circumferential grooves 10 and 11 which, in their orientation and in their contour configuration conform essentially to the central rib. The two particularly wide circumferential grooves 10 and 11 are respectively followed by external circumferentially continuous intermediate ribs 12 and 13 which, while they do conform to the central rib in contour and in their zig-zag shaped orientation, exhibit with respect to the central rib a markedly reduced axial width, with the axial width being measured parallel to the axis 8 of the tire.

The intermediate ribs 12 and 13 constitute a part of the shoulder regions of the tire, which are subsequently completed adjoining the shoulder borders 3 and 4 by respective marginal ribs 16 and 17. The marginal ribs 16 and 17 likewise have a large width corresponding individually substantially to the axial width of the central rib 9. They are individually separated from the adjacent intermediate rib 12 or 13 in each case by a circumferentially continuous but narrow circumferential groove 14 or 15 corresponding substantially in its orientation and contour to the wider circumferential grooves 10 and 11. Accordingly, the marginal ribs 16, 17 along their sides point toward the circumferential central line 7. However, the marginal ribs extend outwardly with their profile sections 20 beyond the shoulder borders 3 and 4 and project radially inwardly toward the tire sidewalls. These profile sections are circumferentially defined by intermediate radial marginal grooves 18 and 19 that project beyond the shoulder edges 3 and 4 into the marginal ribs and contribute to define their profile along the outside. The free extremities of the marginal grooves 18, 19 terminate at the level of the free extremities of the profile sections 20 in each case in a circumferentially continuous groove 21, which connects the tread and shoulder areas with the sidewalls of the tire by guaranteeing the necessary flexibility.

The axial width 31 of the central rib 9 corresponds in the preferred embodiment substantially to the axial width 35 of the marginal ribs 16 and 17. In that arrangement, the width 31 can suitably constitute about one-sixth of the axial tread width 2 between the shoulder edges 3 and 4.

The width 33 of the wide profile grooves 10 and 11 constitutes approximately one-half the width of the central rib 9. By comparison, the width 34 of the circumferential grooves defining the marginal ribs 16 and 17 with respect to the intermediate ribs 12 and 13 is substantially smaller. The same holds true with regard to the width 32 of the intermediate ribs 12 and 13 by comparison to the width 31 of the central rib 9.

Figure 3:
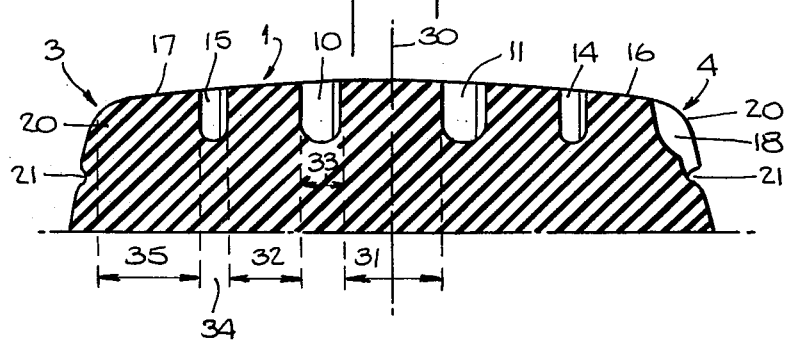
FIG. 3 is a view, in section, through the tread of the tire, taken along line 3—3 of FIG. 2.

In FIG. 3, the reference numeral 30 relates to the equatorial plane of the tire along which the circumferential central line 7 of the tread is oriented.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pneumatic radial tire comprising a tread defined by shoulder edges and having circumferentially continuous profile ribs of zig-zag contour defined by circumferential grooves of zig-zag contour, the axial width of the tread between the shoulder edges comprising only five ribs including marginal ribs and one central rib of respectively large axial width and comparatively narrower respectively intermediately situated ribs and each intermediate rib being defined with respect to said central rib by an axially wide continuous circumferential groove and, with respect to said marginal ribs, by a comparatively narrower continuous circumferential groove, said marginal ribs having substantially the same axial width as the width of said central rib, the axial width of said marginal ribs and of said central rib constituting in each case respectively substantially one-sixth of the axial tread width between said shoulder edges, said marginal ribs being provided with profile sections oriented substantially radially inwardly toward the tire sidewall and defined by circumferentially spatially arranged marginal grooves and in which said marginal grooves terminate at the level of the free extremities of the profile sections in each case in a circumferentially continuous groove.

* * * * *